United States Patent [19]

Babb et al.

[11] Patent Number: 5,000,927
[45] Date of Patent: Mar. 19, 1991

[54] METHOD OF REGULATING A PUREX SOLVENT EXTRACTION PROCESS

[75] Inventors: Steven J. Babb, Clinton; William R. Becker, Wilmington, both of N.C.

[73] Assignee: General Electric Company, San Jose, Calif.

[21] Appl. No.: 331,326

[22] Filed: Mar. 31, 1989

[51] Int. Cl.$^5$ .............................................. B01D 11/00
[52] U.S. Cl. .......................................... 423/10; 423/4; 423/21.1; 252/631; 364/558
[58] Field of Search .......................... 423/4, 10, 21.1; 252/631; 364/558

[56] References Cited

U.S. PATENT DOCUMENTS

| | | | |
|---|---|---|---|
| 2,979,379 | 4/1961 | Schmieding et al. | 423/10 |
| 2,990,240 | 6/1961 | Ellison et al. | 423/10 |
| 4,595,529 | 6/1986 | Neace | 252/631 |
| 4,758,313 | 7/1988 | Schmieder et al. | 204/1.5 |

OTHER PUBLICATIONS

Hanson, Mills, A. L., Recent Advances in Liquid-Liquid Extraction, 1971, pp. 186-196.

Primary Examiner—Edward A. Miller
Assistant Examiner—Ngoclan T. Mai
Attorney, Agent, or Firm—Robert R. Schroeder

[57] ABSTRACT

The "Purex" solvent extraction and separation process for recovering uranium from scrap material or spent fuel containing gadolinia is modified by treating uranium containing scrap or spent fuel with nitric acid to convert uranium oxide to soluble uranyl nitrate in an aqueous medium, separating the uranyl nitrate from the aqueous media with an organic medium containing tri-butyl phosphate, and then releasing the separated uranium from the organic medium with water. The improvement comprises monitoring the density of the organic medium and controlling the feed rate of the uranium in the aqueous medium in response to the density measurements.

7 Claims, 2 Drawing Sheets

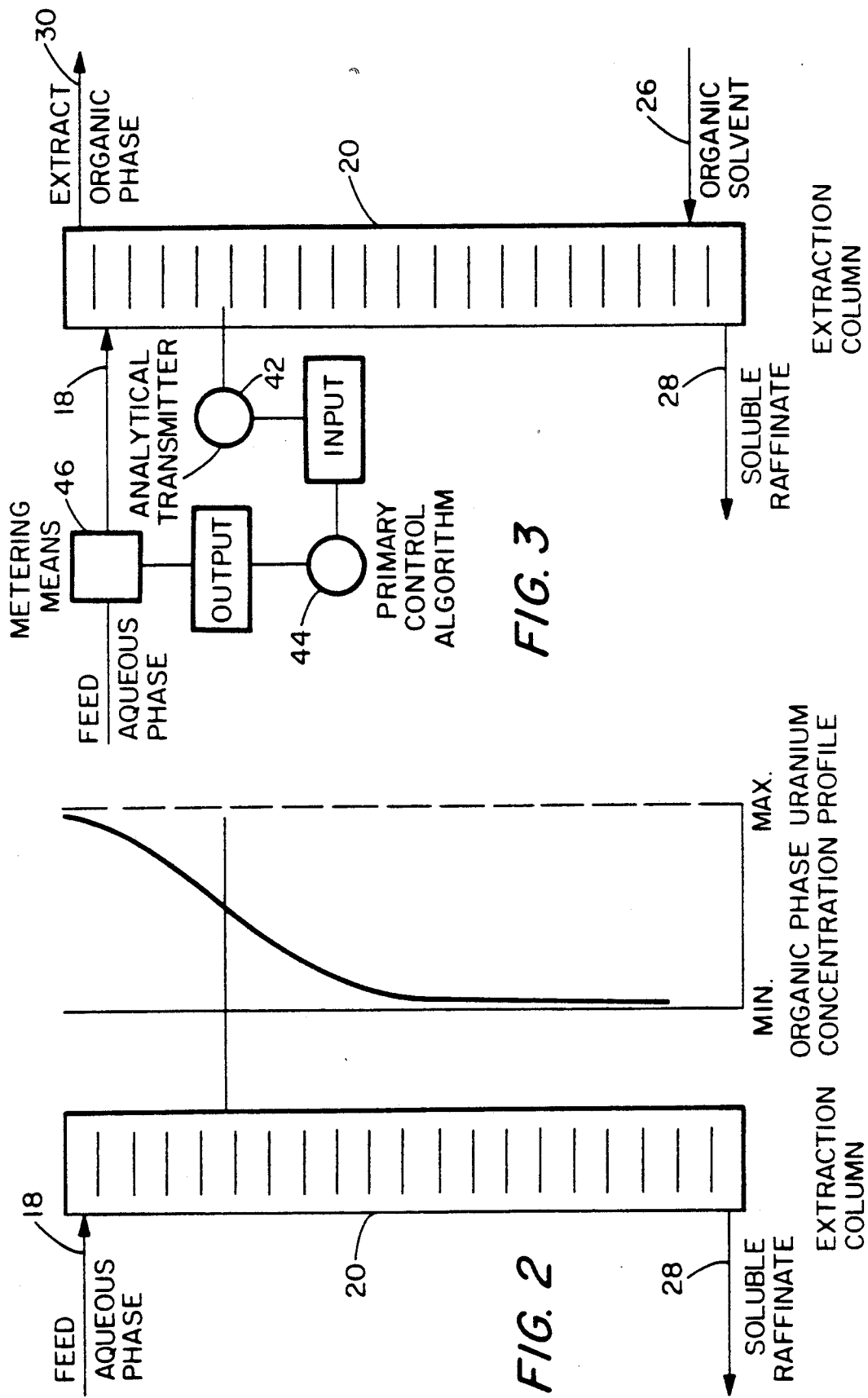

METHOD OF REGULATING A PUREX SOLVENT EXTRACTION PROCESS

FIELD OF THE INVENTION

This invention relates to the so-called "Purex Process" for recovering uranium from waste on spent material containing unwanted contaminants, such as scrap from fissionable nuclear fuel manufacturing or processing, and spent fissionable nuclear fuel from use in a nuclear reactor.

BACKGROUND OF THE INVENTION

This so-called "Purex Process" of solvent extraction for uranium is well known in the nuclear fuel art and industry. For example, the process is described in the U.S. Letters Patent No. 3,357,802, issued Dec. 12, 1967, and discussed in extensive detail in Chapter 10, entitled "Fuel Reprocessing," namely pages 457 to 514, of *Nuclear Chemical Engineering*, by Benedict et al, McGraw-Hill Book Company, 1981. The disclosed contents of the foregoing cited patent and section of the text are accordingly incorporated herein by reference.

Briefly, the Purex process consists of a sequence of chemical steps or operations comprising initially treating the waste of scrap material or spent fuel containing uranium compounds with an aqueous solution of nitric acid ($HNO_3$), and thereby dissolving the uranium to produce uranyl nitrate ($UO_2(NO_3)_2$) and other acid soluble components within an aqueous phase. This aqueous phase containing the acid dissolved components including uranyl nitrate, and any acid insoluble components of the waste is passed down through an extraction column while an organic phase of tri-butyl phosphate in an organic diluent of a paraffinic mixture such as kerosene is passed up through the extraction column in counter-current flow with the aqueous phase. The soluble uranium compounds comprising uranyl nitrate of the aqueous phase are extracted therefrom by the organic phase and combined with the tri-butyl phosphate. This separates the uranium and carries it within the organic phase from the extraction column. The aqueous phase, and the organic phase each exit from the extraction column at opposite ends from each other and from their respective entries, the aqueous phase with the acid soluble raffinate contaminants and the organic phase with the separated uranium.

The organic phase effluent from the extraction column carrying the separated uranium compounds is then passed up through a stripping column while water is passed down through the stripping column in counter-current flow with the organic phase. The water releases the uranium from the tri-butyl phosphate of the organic phase whereby it is transferred to and carried within the aqueous phase. The aqueous phase, and the organic phase each exit from the stripping column at opposite ends from each other and from their respective entries, the aqueous phase containing the uranium compounds for recovery separated from contaminants. The organic phase is then recycled back through the extraction column. Typically, the procedure is carried out with a continuous flow of all components through the system comprising the extraction column and stripping column.

The desired product of the Purex solvent extraction process is a high purity aqueous phase effluent from the system containing virtually all the uranium of the initial waste fed into the system. However, some losses of uranium occur in the raffinate effluent by design and represent an economic loss. There is an acknowledged "trade-off" between the uranium product purity obtainable and the level of uranium loss in the raffinate. The extent of this balance of benefits depends substantially upon individual design. To enhance impurity reduction, some system designs include an intermediate scrub-section adjoining or as a section of the extraction column.

A decontamination factor (df) may be defined which measure the process capability to remove impurities; the higher the decontamination factor rating for a given impurity the more capable the process in removal capacity. The factor is calculated from parts impurity per million parts uranium in the feed, divided by the some measure in the product stream. Typically, the conventional Purex process is rated in the order of a gadolinia decontamination factor of 30,000.

The columns are typically agitated by either pulse pumps or reciprocating plates to permit optimal droplet formation and coalesence on each plate. This agitation is most commonly referred to as mixing energy. Excessive mixing energy or flow rates can cause flooding, a condition which precludes flow of one or both liquid operating mode phases in the column. Mixing energy is critical to efficiency of the extraction column and helps establish a characteristic uranium profile.

In the Purex process the bulk of the impurity removal or decontamination of uranium compounds is achieved near the inlet of the extraction column for feeding the acid treated waste material. The most efficient operation of the extraction column is substantially at the level of flooding which produces the maximum removal of impurities such as gadolinia. The term flooding refers to a condition in which the two immiscible phases flow countercurrent past each other with a relative velocity that is sufficient to impede the steady flow of one phase or the other phase. However, this renders the extraction column very sensitive to minor changes in the net balance of uranium among all flow streams entering and leaving the column, and practically difficult to control. Excessive uranium loading can aggravate the possibility of flooding, while deficient net uranium loading greatly reduces impurity removal.

When the extraction column is operating at a steady state, a uranium concentration profile therein can be obtained by sampling either the organic or aqueous phase at several points along the vertical length of the column. The profile depends on the degree of trade off chosen between uranium product purity and level of uranium loss.

SUMMARY OF THE INVENTION

This invention comprises an improvement in the Purex solvent extraction process for the recovery and purification of uranium. The invention includes improved means and procedure for establishing and maintaining optimum uranium distribution and recovery in operating a Purex solvent extraction process. The process conditions are monitored by means of measuring density conditions within the extraction column and manipulating to process conditions in response to any changes in the density measurements. This strategy is unique and valuable in that it applies real time control and actually prevents process upsets which are invisible to conventional means during the critical time period for which recovery is possible.

OBJECTS OF THE INVENTION

It is a primary object of this invention to provide an improved means for regulating the relative flow rates or quantities, and in turn the efficiency of a Purex solvent extraction process for recovering and purifying uranium.

It is also an object of this invention to provide an improved means for operating a Purex solvent extraction process for recovering purified uranium which effectively and with an extremely high degree of reliability reduces rare earth impurities of the purified uranium product to much less than 1 part per million of uranium, and achieves higher decontamination factors than the conventional process not equipped for real time control.

It is a further object of this invention to provide an improved Purex solvent extraction process for recovering and purifying uranium from waste or spent fuel which provides for a high level of uranium recovery with little loss.

It is a still further object of this invention to provide an improved Purex solvent extraction process for uranium which simplifies control of the process operation and is highly reliable and reduces costly procedures.

It is an additional object of this invention to provide an improved Purex solvent extraction process for recovering and purifying uranium which can be trended to diagnose the process conditions and systematically reduce sources of error.

BRIEF DESCRIPTION OF THE DRAWINGS

FIG. 2 of the drawing comprises a diagram of the extraction column of a Purex solvent extraction process matched with a graph of the organic phase uranium concentration profile as it occurs in the extraction column; and FIG. 3 of the drawing comprises a flow diagram of one embodiment of the improvement of this invention as applied to the extraction column of a Purex solvent extraction process.

DETAILED DESCRIPTION OF THE INVENTION

Figure 1:
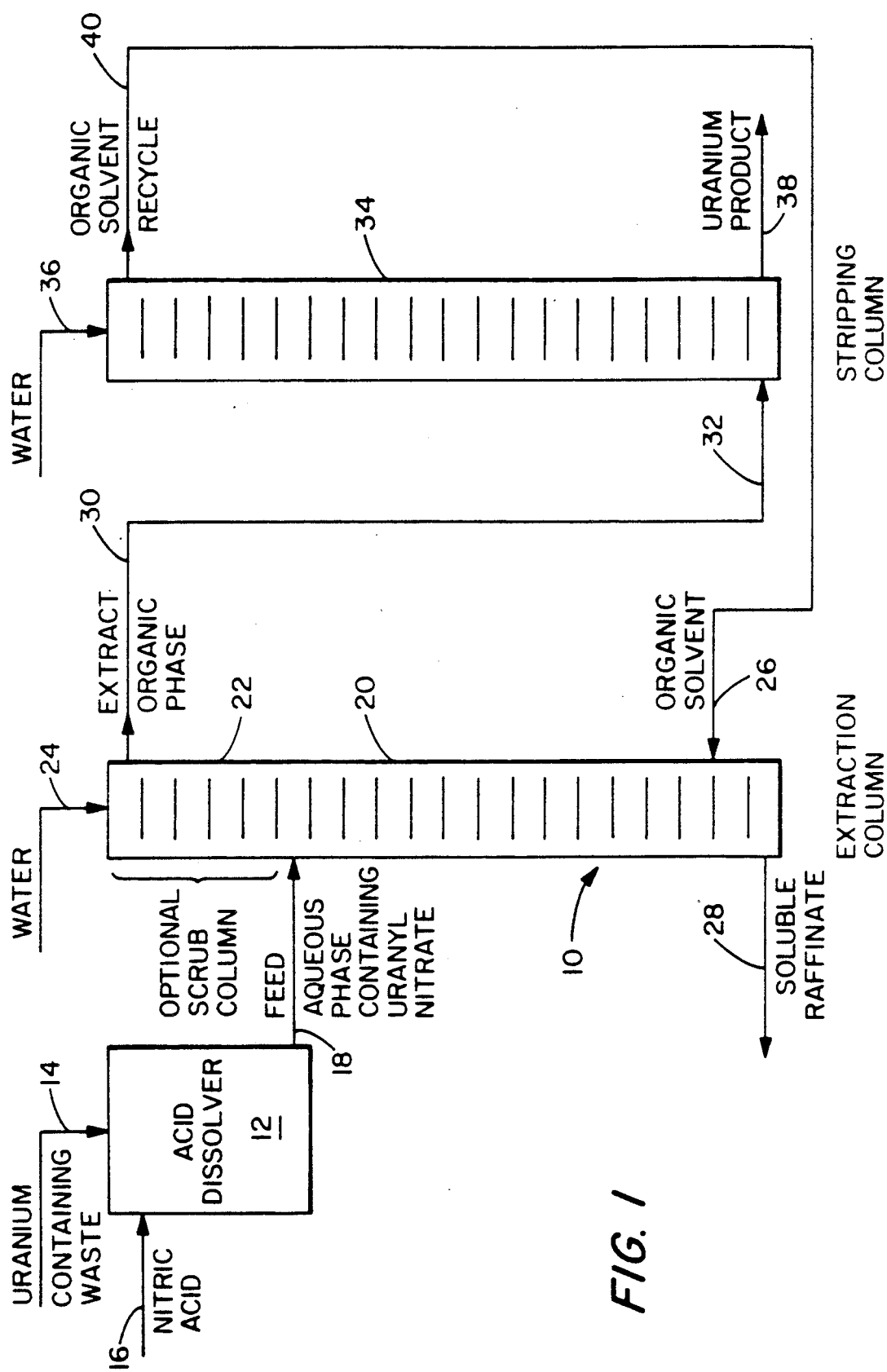
FIG. 1 of the drawings comprises a simplified flow diagram of the steps of the Purex solvent extraction process.

Referring to the drawings, in particular FIG. 1, the Purex solvent extraction and purification system 10 for the recovery of uranium comprises an acid dissolving vessel 12 provided with a source of waste material 14 containing uranium compounds and a supply of nitric acid ($HNO_3$) 16 in an aqueous medium. Uranium contents of the waste material, along with any other nitric acid soluble components, are dissolved with the nitric acid in vessel 12, converting the uranium compounds into water soluble uranyl nitrate. This aqueous phase of weak acid containing any nitric acid soluble components of the waste and the soluble components including the uranyl nitrate are fed through a feed inlet 18 into the upper portion of an extraction column 20. Preferably this aqueous phase from vessel 12 is filtered before feeding into extraction column 20.

As an option, extraction column 20 can be provided with a scrub column 22, or scrub section, at its upper end above the aqueous phase feed inlet 18. A scrub column extension 22 or section added to the extraction column 20 will enhance impurity reduction in the process with the introduction of water into the uppermost portion of the combined column 20 and 22 through inlet 24. Moreover, the water scrub stream may be weakly acidified with nitric acid if desired, and the scrub column separate and intermediate between extraction column 20 and stripping column 34.

The aqueous phase, containing any nitric acid soluble components including uranyl nitrate and soluble components, fed into the extraction column 20 flows downward within the column while an organic phase is fed through a feed inlet 26 into the lower portion of the extraction column 20 and flows upward within the column counter-current to the down flowing aqueous phase. The organic phase, containing tributyl phosphate and an organic diluent, upon making counter-flowing contact within the extraction column with the aqueous phase, separates the uranium by means of the tri-butyl phosphate chemically combining with the uranium oxide ++ions dissolved in the aqueous phase while excluding soluble impurities. The insoluble impurities are carried downward in the aqueous phase to an outlet 28 in the lower portion of the extraction column 20 for soluble raffinate.

The organic phase of tri-butyl phosphate combined with uranium and the organic diluent flows upward to an extract outlet 20 in the upper portion of the extraction column 20.

From extractor column outlet 30, the organic phase containing the uranium combined with the tri-butyl phosphate and organic diluent is conveyed through a duct to an inlet 32 in the lower portion of a stripping column 34. Water is fed into the upper portion of the stripper column 34 through inlet 36 for flow downward through the column countercurrent to the upward flow of the organic phase entering in a lower portion The water contacting the organic phase in counter flow within the stripping column 34 releases the water soluble uranium compounds from the tri-butyl phosphate and organic phase, and the water containing the separated uranyl nitrate product is discharged from the column through an outlet 38 in its lower portion An organic phase outlet 40 for the organic solvent in the upper portion of stripping column 34 discharges the organic solvent into a duct which is in fluid communication with the organic phase inlet 26 for recycling the organic solvent comprising the tri-butyl phosphate and organic diluent for reuse.

This Purex solvent extraction system is intended to produce a high purity aqueous stream containing virtually all the uranium of the material initially fed into the system.

In the operation of a Purex solvent extraction system such as described, there is some loss of uranium in the raffinate discharge which represents an economic loss This is mainly due to an operational trade-off between product purity obtained and degree of uranium loss in the raffinate, with specific balances of these factors depending upon the system designs.

Substantially all of the impurity removal, or decontamination of this process, is achieved in the extraction column close to the location of introducing the acid treated waste material, namely feed inlet 18. The extraction column is most efficiently operated close to the point of flooding, a level which produces the highest removal of impurities such as gadolinia. However, when operating under such circumstances, the column becomes very sensitive to minor changes in the net uranium balance among all flow streams entering and leaving the column This sensitivity arises because close to the point of flooding, mass transfer of uranium to the organic phase is greatly enhanced at key locations in the extraction column. When the extraction column is at steady state, a uranium concentration profile can be obtained by sampling either the organic phase or the aqueous phase at several points along the vertical length of the column.

An optimum extraction profile for the extraction column, as shown in FIG. 2 of the drawings, has several significant features. For instance, at the top of the extraction column, the uranium bearing waste material feed contacts the organic phase, and at this stage the organic phase saturation may be about 80 percent of the ultimate uranium carrying capacity of the tri-butyl phosphate and paraffinic hydrocarbon mixture used Very little uranium is transferred into the organic phase at the location of introducing the acid treated waste material, namely feed inlet 18 However, a high saturation of uranium in the organic phase forces partitioning of the contaminants. This partitioning phenomenon increases markedly with the degree of saturation The possibilities of high uranium loss and flooding disruption, nevertheless, are ever-present hazards when high saturation conditions occur.

The bulk of the uranium transfer from the aqueous phase to the organic phase occurs in a short section of the extraction column located several feet down from the location of introducing the acid treated waste material, namely feed inlet 18. This active section is sometimes referred to as the "uranium transfer zone", and is significant with respect to this invention. This uranium transfer zone also tends to be an area of high impurity concentration. The impurities are precluded from moving up the column with the organic phase because of high degree of saturation in the upper area. Thus, if the organic phase saturation is only temporarily reduced, contaminants may be carried upward with the organic phase and entrained within the product.

The lower portion of the extraction column below the uranium transfer zone removes uranium to an acceptable residual uranium loss in the raffinate.

The shape of the uranium extraction curve, see FIG. 2, will have a very substantial effect upon the economical operation of the extraction system since either some uranium loss will occur or the level of purification will drop unless this extraction curve is optimumly established and maintained. For example, when the extraction column is operated near the point of flooding, a uranium balance change of only about one percent can have a significant adverse affect upon the performance of the extraction column.

Typically, the Purex solvent extraction process for uranium requires hours to approach steady-state conditions. Conventional external extraction column measurements on the several flow stream conditions are only likely to ascertain irregularities or changes after the operation has been deleteriously affected. Moreover, once the process operation is disturbed or upset, recovery to optimum is equally slow and downstream equipment may be contaminated with impurities.

In accordance with the improvement of this invention, the uranium concentration is measured within the extraction column 20 at the approximate location therein where the bulk of uranium transfer from the aqueous phase to the organic phase occurs under optimum operating conditions. This location can be determined by comparing samples taken at several locations along the length of the column. In a preferred embodiment, the uranium concentration is determined by measuring the density of the organic phase at the single approximate location in the uranium transfer zone determined optimal for the desired operating conditions, although other properties of either the organic or aqueous phase can be employed, and the location of the measurement can vary depending upon the specific extraction column design.

The density of organic phase can be determined using a Rosemount Differential Pressure Transmitter, Model 1151 DP, and a tube to measure the weight of a fixed height of organic in an overflow trap. The weight or differential pressure is proportional to density and is calculated.

In a preferred embodiment, as shown in Figure 3, the density of the organic phase is continuously measured with an analytical transmitter 42 and the data transmitted electronically to an automatic controller 44 comprising a primary control algorithm. Other data transmitting means such as pneumatic or optical systems can be used. The controller acts upon the density signal by calculating the process deviation from the ideal set point and determining an appropriate corrective action. The correcting calculation preferably includes a standard proportional/integral/derivative algorithm. The corrective action is then applied to the feed metering system 46, which may comprise metering pumps, or a closed loop flow control.

Specifically, when the measured density declines below a set-point, the automatic controller 44 increases the feed rate of the aqueous phase containing the nitric acid soluble components comprising uranyl nitrate to correct the net uranium balance. Thus, high organic phase saturation of uranium would be automatically maintained, and impurities would not spill over with undersaturated organics.

Conversely, a net uranium balance which would overload the extraction column with uranium would be ascertained by an increase in uranium density by the measurement. Then the automatic controller would act in response to the increase to decrease the feed rate of the aqueous phase containing the nitric acid soluble components comprising uranyl nitrate and thereby prevent a costly loss of uranium at the bottom of the column. Thus, the characteristic variations in phase density within the uranium transfer zone provide a unique means for maintaining control of the solvent extraction process.

The system of this improvement in the process of solvent extraction of uranium does not require taking measurements at multiple points along the column, or through the system, or routine analysis of external effluent streams from the system such as the extraction product or raffinate to provide the means for controlling performance.

What is claimed is:

1. An improved solvent extraction process employing two liquid contact columns for separating and recovering uranium oxides from contaminants in uranium oxides containing waste materials including gadolinia, consisting essentially of the combination of steps of:
   a. applying an aqueous solution of nitric acid to waste material containing uranium oxides and gadolinia and dissolving acid soluble constituents of the waste material including the uranium oxides and thereby converting the uranium oxides to water soluble uranyl nitrates in an aqueous phase;

b. continuously feeding the waste material comprising a mixture with acid dissolved constituents including uranyl nitrates in an aqueous phase downward through an extraction first column while simultaneously continuously feeding an organic phase comprising tri-butyl phosphate and organic diluent upward through the extraction first column providing continuous counter-current flow between said aqueous phase and organic phase, thereby releasing the uranyl nitrates from the aqueous phase by combining said uranyl nitrates with the tri-butyl phosphate to separate the uranium oxides from contaminants and carry the separated uranyl nitrates within the organic phase upward in extraction first column to a discharge which continuously feeds into a stripper second column while the aqueous phase continues downward to a raffinate discharge in the extraction first column carrying soluble contaminants;

c. continuously feeding the organic phase comprising the combined uranyl nitrates and tri-butyl phosphate upward through the stripping second column while continuously feeding water downward through the stripping second column providing continuous counter-current flow between the organic phase and water, and thereby stripping the uranyl nitrate from the tri-butyl phosphate and organic phase, and carrying the stripped uranyl nitrate in the water to a discharge from the stripping second column; and d. continuously measuring the density of the organic phase at a location within the upper portion of the extraction first column where the maximum rate of combining or uranyl nitrates with the tri-butyl phosphate occurs, and regulating the rate of the continuous feeding of the waste material in aqueous phase into the extraction first column in response to the continuous density measurements comprising increasing the rate of feeding the waste material in aqueous phase when the measured density of the organic phase in the upper portion of the extraction first column decreases and conversely decreasing the rate of feeding the waste material in aqueous phase when the measured density of the organic phase in the upper portion of the extraction first column increases.

2. The improved solvent extraction process of claim 1, wherein the organic phase discharged from the stripping second column is recycled back into the extraction column for reuse.

3. The improved solvent extraction process of claim 1, wherein the extraction first column in joined with a scrub column section.

4. The improved solvent extraction process of claim 1, wherein the organic phase is comprised of tri-butyl phosphate and a paraffinic compound.

5. The improved solvent extraction process of claim 1, wherein the continuously measured organic density in the upper portion of the extraction first column is electronically transmitted to an automatic controller for regulating the rate of feed of the waste material.

6. The improved solvent extraction process of claim 5, wherein a computer control algorithm determines the rate of changing the feed of the waste material in aqueous phase continuously fed downward through the extraction first column.

7. The improved solvent extraction process of claim 1, wherein the continuously measured organic density in the upper portion of the extraction first column is optically transmitted to an automatic controller operating a feed meter.

* * * * *